United States Patent [19]

Murata

[11] Patent Number: 4,862,284
[45] Date of Patent: Aug. 29, 1989

[54] COPIER WITH ACCURATELY POSITION-CONTROLLABLE SUB-SCANNING UNIT

[75] Inventor: Kazuyuki Murata, Katano, Japan

[73] Assignee: Matsushita Electric Industrial Co., Ltd., Osaka, Japan

[21] Appl. No.: 95,109

[22] Filed: Sep. 11, 1987

[30] Foreign Application Priority Data

Sep. 16, 1986 [JP] Japan ............................ 61-217405
Oct. 7, 1986 [JP] Japan ............................ 61-238305

[51] Int. Cl.⁴ .............................................. H04N 1/04
[52] U.S. Cl. .................................. 358/451; 358/474; 358/486
[58] Field of Search ............... 358/287, 288, 293, 285

[56] References Cited

U.S. PATENT DOCUMENTS

| | | | |
|---|---|---|---|
| 4,204,725 | 5/1987 | DiStefano et al. | 358/294 |
| 4,271,436 | 6/1987 | Kurose et al. | 358/284 |
| 4,635,129 | 1/1987 | Miyagi | 358/293 |
| 4,687,944 | 8/1987 | Mitsuka et al. | 358/293 |
| 4,701,805 | 10/1987 | Maeshima | 358/287 |

FOREIGN PATENT DOCUMENTS

| | | |
|---|---|---|
| 0107184 | 10/1983 | European Pat. Off. |
| 59-63876 | 4/1984 | Japan |
| 59-67776 | 4/1984 | Japan |
| 59-122075 | 7/1984 | Japan |
| 61-45670 | 3/1986 | Japan |

*Primary Examiner*—James J. Groody
*Assistant Examiner*—Kim Yen Vu
*Attorney, Agent, or Firm*—Wenderoth, Lind & Ponack

[57] ABSTRACT

A copier comprises an original table for placing thereon an original sheet, a sub-scanning unit including an image reading sensor for reading an image on the original sheet and for scanning the original sheet on the original table, a printing unit which prints the image read by the image reading sensor on a printing sheet, and a control unit which controls the operation of the sub-scanning unit by selectively using a position profile control and a speed profile control. The operation start position and operation starting timing control of the sub-scanning unit using the position profile control permits high-speed continuous repetitive copying and high-accuracy enlargement, reduction, and transfer copying.

7 Claims, 13 Drawing Sheets

ROM-1
DATA TABLE

| ADDRESS | |
|---|---|
| 0 | A(0)ℓ |
| 1 | A(0)u |
| 2 | A(1)ℓ |
| 3 | A(1)u |
| 2n | A(n)ℓ |
| 2n+1 | A(n)u |

FIG. 9(b)

ROM-2
DATA TABLE

| ADDRESS | |
|---|---|
| 0 | Z(0)ℓ |
| 1 | Z(0)u |
| 2 | Z(1)ℓ |
| 3 | Z(1)u |
| 2m | Z(m)ℓ |
| 2m+1 | Z(m)u |

FIG. 9(c)

ROM-3
DATA TABLE

| ADDRESS | |
|---|---|
| 0 | D(0)ℓ |
| 1 | D(0)u |
| 2 | D(1)ℓ |
| 3 | D(1)u |
| 2m | D(m)ℓ |
| 2m+1 | D(m)u |

FIG. 10(a)

ROM-4 DATA TABLE

| ADDRESS | |
|---|---|
| 0 | $W(0)\ell$ |
| 1 | $W(0)u$ |
| 2 | $W(1)\ell$ |
| 3 | $W(1)u$ |
| $2m$ | $W(m)\ell$ |
| $2m+1$ | $W(m)u$ |

FIG. 10(b)

ROM-5 DATA TABLE

| ADDRESS | |
|---|---|
| 0 | $V(0)$ |
| 1 | $V(1)$ |
| 2 | $V(2)$ |
| 3 | $V(3)$ |
| $n-1$ | $V(n-1)$ |
| $n$ | $V(n)$ |

FIG. 11(a) DATA IN ROM-1

FIG. 11(b) DATA IN ROM-5

COPIER WITH ACCURATELY POSITION-CONTROLLABLE SUB-SCANNING UNIT

BACKGROUND OF THE INVENTION

1. Field of the Invention

This invention relates to a copier, and more particularly to the control of a sub-scanning unit.

2. Description of the Prior Art

Recently, copiers are required having a higher copying rate and higher picture-positioning accuracy for their various editing functions.

In the conventional copiers, the drive sequence of the sub-scanning unit, which mechanically scans an original sheet, is such that the sub-scanning unit accelerates from the home position (the position where the sub-scanning unit is normally waiting) until it reaches a specified speed, makes sub-scanning at the specified speed to the original image reading end position, and returns to the home position. The sub-scanning unit always operates in this sequence regardless of the position of the original sheet on the original table and regardless of the size of the original sheet. Even when a same image of one original sheet is copied repeatedly, the above drive sequence is repeated for each copying operation. That is, the sub-scanning unit is returned to the home position after each copying operation for the next sequence. Therefore, the copying rate is inherently limited because of the continuous repetitive copying operation. For example, a continuous repetitive copying rate of 30 sheets/min for the A4 size sheet cannot be attained.

Also, to achieve enlargement, reduction, or transfer copy function, the acceleration time of the sub-scanning unit for each of numerous copying modes must be previously measured. (Refer to, for example, Laid Open Japanese Patent Application No. 59-63876 and No. 61-45670.)

These problems of conventional copiers are due to the difficulty in accurately controlling the sub-scanning unit. The conventional sub-scanning units are controlled by the PLL control or by the open loop control of a stepping motor. Using these control methods, it is difficult to control the sub-scanning unit accurately and flexibly.

SUMMARY OF THE INVENTION

It is an object of the invention to provide a copier which allows accurate control of the sub-scanning unit.

Another object of the invention is to provide a copier which permits a high-rate continuous repetitive copying.

Still another object of the invention is to provide a copier which permits enlargement, reduction, and transfer copying at a higher accuracy.

The copier according to the invention comprises an original table for placing thereon an original sheet, a sub-scanning unit including an image reading means for reading an image on the original sheet on the original table and scanning the original sheet in a sub-scanning direction, a printing means for printing an image read by the image reading means on a printing sheet, and a control means for selectively using one of a position profile control and a speed profile control to control operation of the sub-scanning unit.

In a preferred control example, the control means controls the operation starting position of the sub-scanning unit according to an image reading start position of the original sheet by using the position profile control.

The copier is further provided with a copy mode selection means to select one of the copy modes, including at least one of enlargement, reduction, and transfer of the copying image. In a preferred control example, the control means controls the operation start position and operation start timing of the sub-scanning unit according to an image reading start position of the original sheet and the selected copy mode.

The control means comprises a drive means for driving the sub-scanning unit, a status detecting means for detecting a position and a speed of the sub-scanning unit, a storage means for storing position reference data and speed reference data, a position control means forming a position servo loop together with said drive means and said status detecting means, a speed control means forming a speed servo loop together with said drive means and said status detecting means, a servo loop selection means for selecting either one of the position servo loop or the speed servo loop, and a central processing unit which selectively controls the position control means and the speed control means by selectively using the position reference data and the speed reference data.

The control means can be further provided with a storage means for storing data for determining an operation start position and an operation start timing of the sub-scanning unit, and can control the operation start position and start timing of the sub-scanning unit by reading the data in the further provided storage means according to the image reading start position and the selected copying mode.

The above and other objects, features and advantages of the invention will be apparent from the following description taken in connection with the accompanying drawings in which:

DESCRIPTION OF THE PREFERRED EMBODIMENTS

Figure 1:
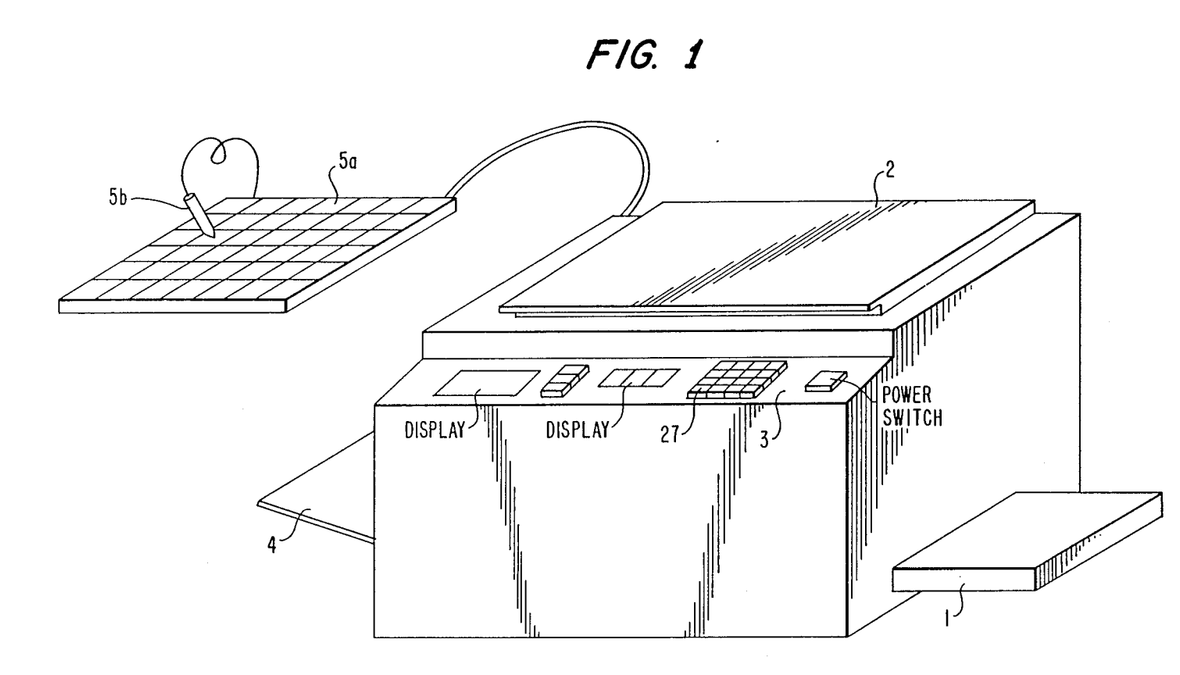
FIG. 1 is an external view showing an embodiment of the copier of the present invention.

FIG. 1 is a schematic external view of a digital copier. The copier in FIG. 1 has a sheet supply cassette 1, an original sheet cover 2, an operation pannel 3 provided with a keyboard, a display, etc., and a sheet outlet tray 4, in the same way as the general copier. Symbols 5a and 5b represent a tablet and a pen, respectively, for coordinate input used in editing operations such as trimming.

Figure 2:
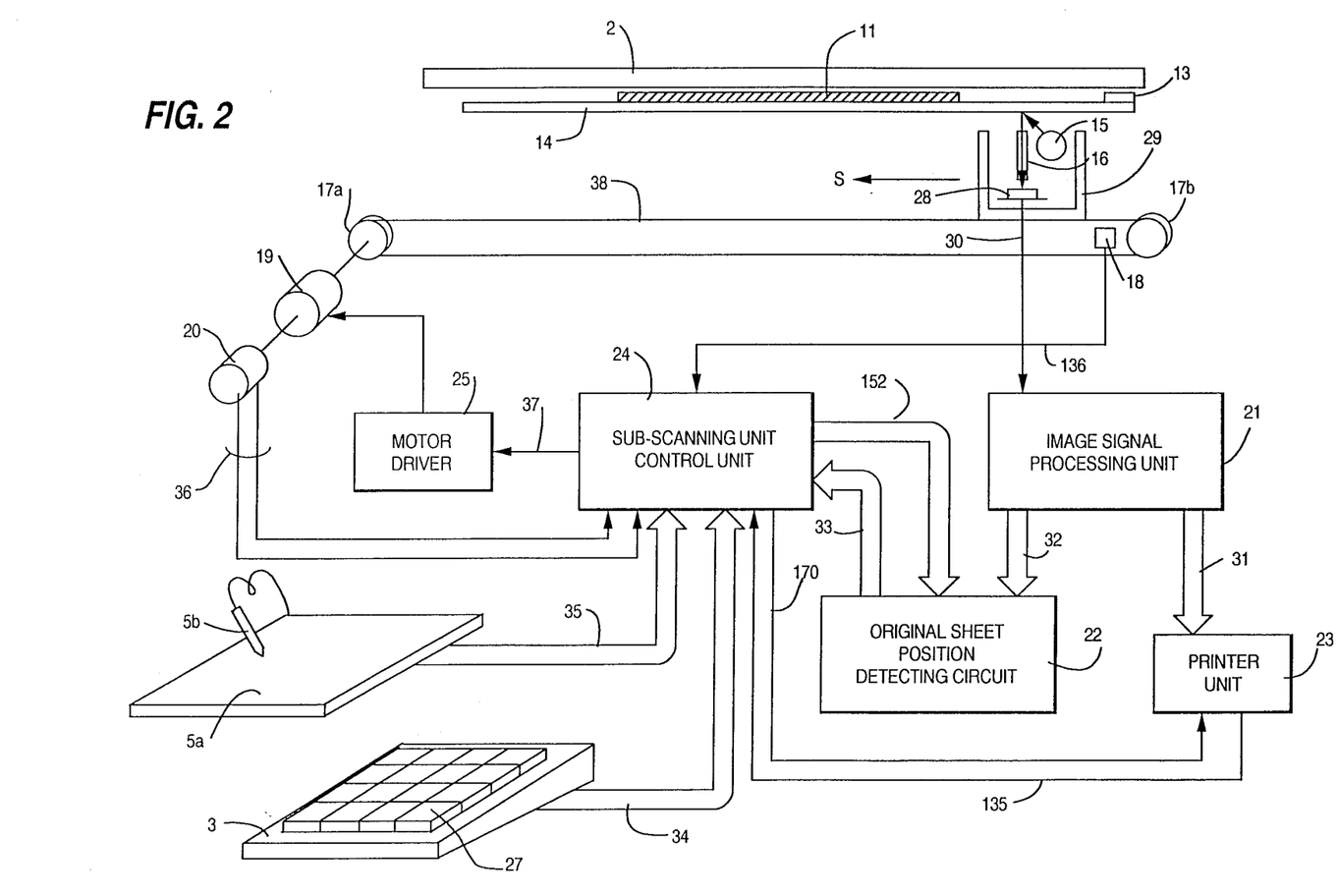
FIG. 2 is a schematic block diagram showing an internal configuration of the copier shown in FIG. 1.

FIG. 2 is a block diagram showing an internal configuration of the copier in FIG. 1. An original sheet 11 is placed on a transparent original table (platen glass) 14 and pressed against the table 14 by the original sheet cover 2. The image-printed lower surface of the original sheet 11 is illuminated by a light source 15, and the light reflected by the original sheet 11 is converged on a line image sensor 28 by a rod lens array 16. The image sensor 28 outputs electric signals 30 corresponding to the quantity of the reflected light from the original sheet 11. An image signal processing unit 21 receives the electric signals 30 from the image sensor 28, applies the signals 30 with known signal processings such as A/D conversion, shading correction, gamma correction and pseudo gray level processing, and outputs a video data 31 to a printer unit 23.

A sub-scanning unit 29 including the light source 15, rod lens array 16 and image sensor 28 is driven by a wire 38, pulleys 17a and 17b, and a motor 19 in the direction of arrow S to perform sub-scanning of the original sheet 11. The speed or rotary position of the motor 19, that is, the speed or position of the sub-scanning unit 29, is obtained from an output of a pulse encoder 20. A white level reference plate 13 is used for shading correction to correct variations in sensitivity of sensing elements of the image sensor 28, and variations in illuminance of the light source 15.

An original sheet position detecting circuit 22 detects the position of the original sheet 11 on the original table 14 from data 32 including a density data outputted from the image signal processing unit 21. The detection of the original sheet position is attained by pre-scanning the original sheet 11.

A sub-scanning unit control unit 24 controls the sub-scanning unit 29 using a torque command 37 given to a motor driver 25, according to: output signals 36 from the pulse encoder 20 connected to the motor 19; copy mode selection data 34 from a copy mode selection keyboard 27 on the operation panel 3; coordinate specifying data 35 from the coordinate input tablet 5a; and, original sheet position data 33 from the original sheet position detecting circuit 22. The copy mode selection data 34 includes copy mode specifying data for enlargement, reduction, transfer and continuous repetitive copying, as well as specifying data for zooming ratio and reduction ratio. The control unit 24 drives the sub-scanning unit 29 toward a home position sensor 18 when the power is supplied to the copier. The home position sensor 18 outputs a detection signal 136 upon detecting the sub-scanning unit 29, and resets a motor position counter (described later) contained in the sub-scanning unit control unit 24.

Figure 3:
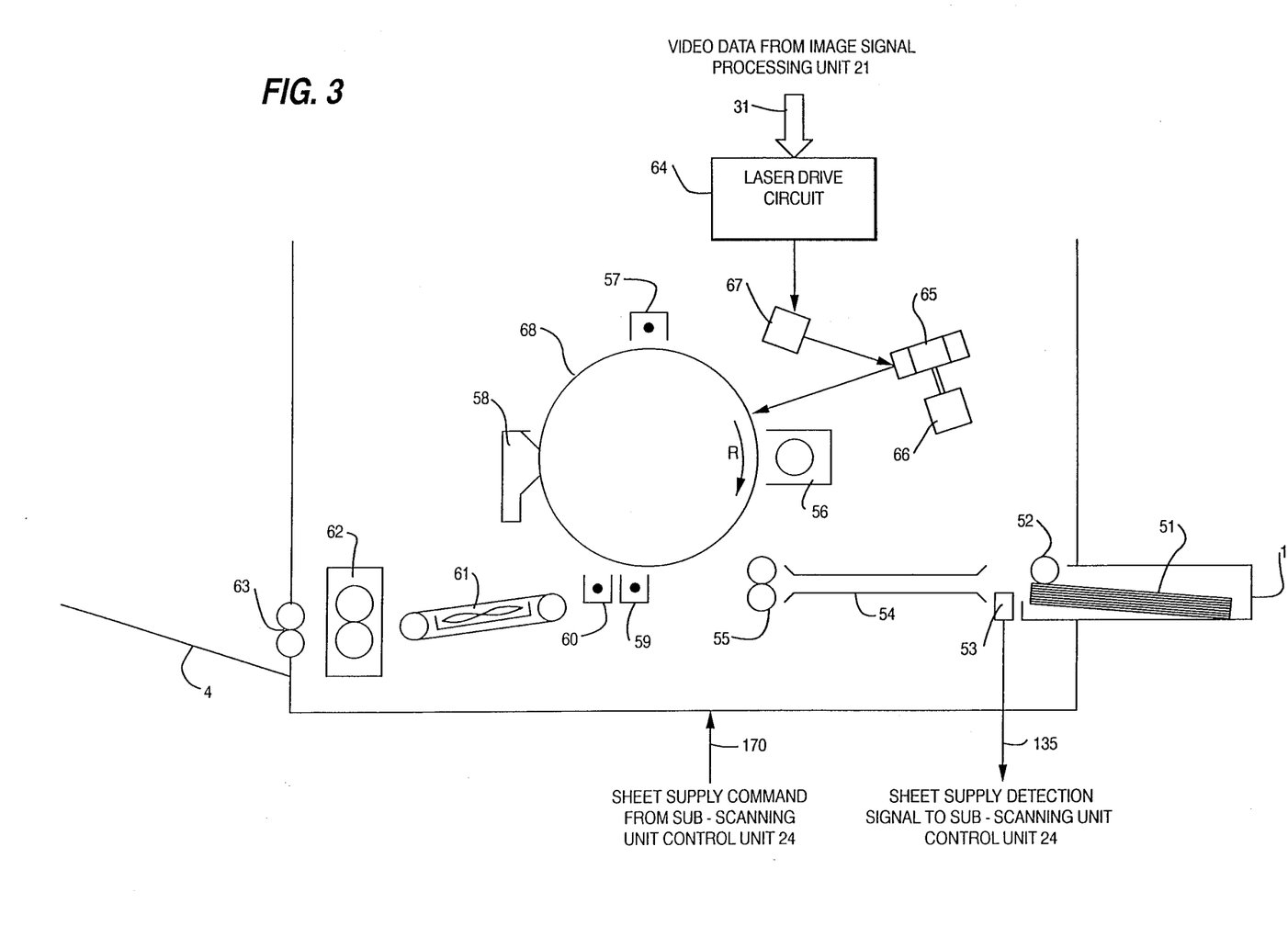
FIG. 3 is a schematic diagram showing an internal configuration of the printer unit in FIG. 2 block diagram.

FIG. 3 shows an internal configuration of the printer unit 23. A printing sheet 51 stored in the sheet supply cassette 1 is fed by the supply rollers 52, guided between a pair of guide plates 54, and brought in contact with a photoconductive drum 68 by a pair of rollers 55. A scanner motor 66 rotates a polygon mirror 65. The polygon mirror 65 reflects an output laser beam from a semiconductor laser 67 to scan the surface of the photoconductive drum 68. The photoconductive drum 68 rotates in the direction of arrow R. A charger 57 charges the photoconductive drum 68. A laser drive circuit 64 modulates the output laser beam power from the semiconductor laser 67 with the video data 31. The modulated laser beam forms a latent image on the photoconductive drum 68. A developer 56 develops the latent image on the photosensitive drum 68 with toner. A transfer charger 59 transfers the toner on the photosensitive drum 68 onto the printing sheet. A separation charger 60 separates the printing sheet from the photoconductive drum 68. A carrier belt 61 conveys the printing sheet separated from the photoconductive drum to a fixer 62. The fixer 62 fixes the transferred toner on the printing sheet. The printing sheet is discharged by a pair of discharging rollers 63 onto the sheet outlet tray 4. A sheet supply sensor 53, upon detecting a printing sheet supplied, outputs a sheet supply detection signal 135. A cleaning device 58 removes toner and charges remaining on the photosensitive drum 68. A printer unit such as the one described above is well known as a laser beam printer using electronic photographic process.

Figure 4:
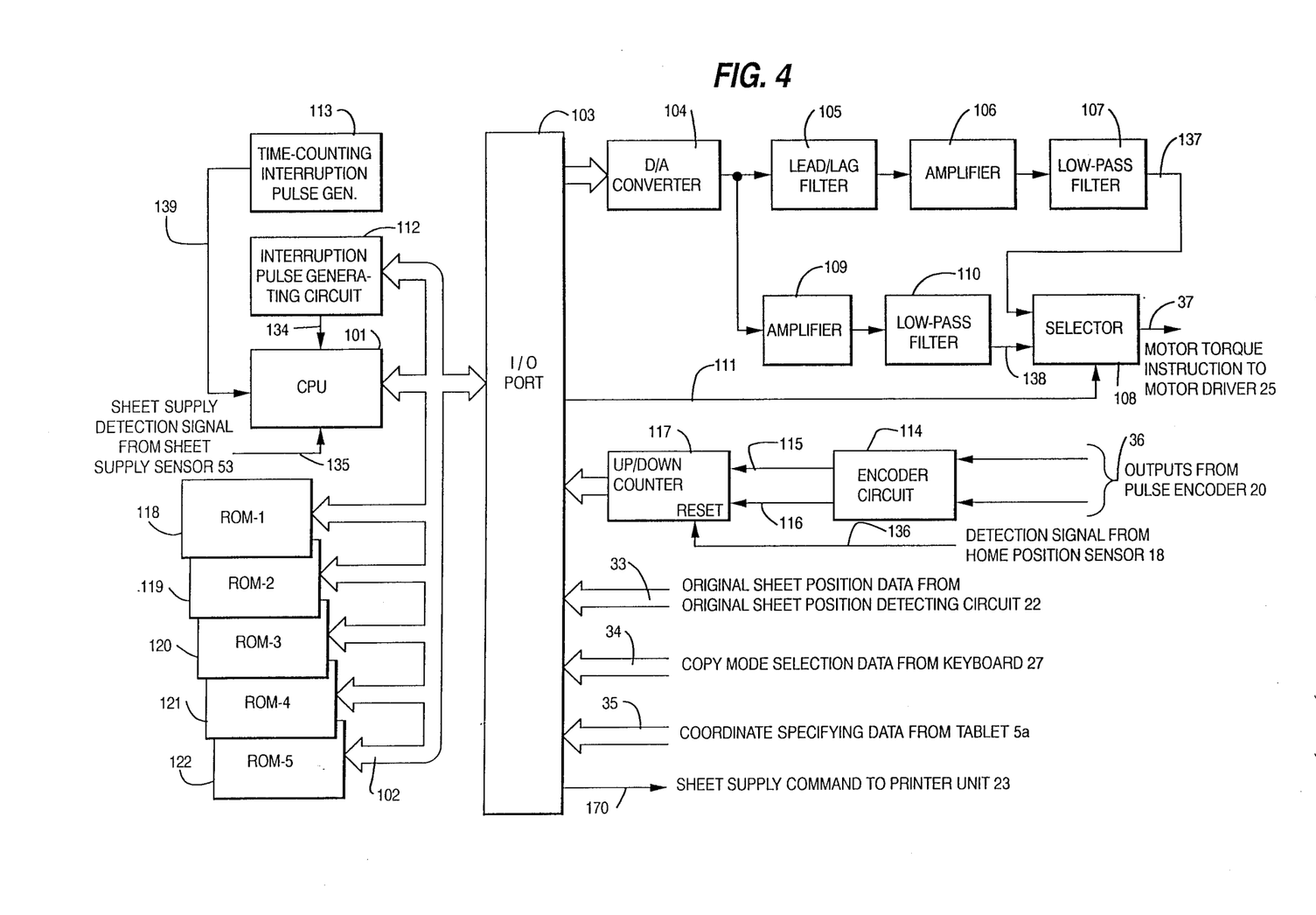
FIG. 4 is a block diagram showing the sub-scanning unit control unit in FIG. 2.

FIG. 4 is a block diagram of the sub-scanning unit control unit 24 shown in FIG. 2. A CPU (Central Processing Unit) 101 accesses an I/O port 103 and ROM (Read Only memory) -1 to ROM-5 118 to 122 through a data bus 102. Using data tables stored in ROM-1 to ROM-5, the CPU 101 calculates a position where the sub-scanning unit 29 should be positioned (hereinafter called "position reference") and a speed at which the sub-scanning unit 29 should move (hereinafter called "speed reference"). The data tables stored in ROM-1 to ROM-5 will be described in detail later.

An encoder circuit 114 makes direction discrimination using the 2-phase signals 36 from the pulse encoder 20 and produces a forward rotation pulse 115 or a reverse rotation pulse 116 for the motor 19. An up/down counter 117 is a reversible counter using the forward rotation pulse 115 or the reverse rotation pulse 116 outputted from the encoder circuit 114 as a clock input. The up/down counter 117 is reset by the home position detecting signal 136 from the home position sensor 18. The CPU 101 reads the count output data from the up/down counter 117 through the I/O port 103 to determine the present position of the sub-scanning unit 29. The CPU 101 can further access the copy mode selection data 34 from the copy mode selection keyboard 27, the coordinate specifying data 35 from the coordinate input tablet 5a, and the original sheet position data 33 from the original sheet position detecting circuit 22, through the I/O port 103. The sheet supply detection signal 135 from the sheet supply sensor 53 is inputted as an interruption signal into the CPU 101.

The CPU 101, a D/A converter 104, a lead/lag filter 105, an amplifier 106, a low-pass filter 107, the motor driver 25, the motor 19, the pulse encoder 20, the encoder circuit 114 and the up/down counter 117 constitute a position servo loop for position control. The CPU 101, the D/A converter 104, an amplifier 109, a low-pass filter 110, the motor driver 25, the motor 19, the pulse encoder 20, the encoder circuit 114 and the up-/down counter 117 constitute a speed servo loop for speed control. A selector 108 selects either of the position servo loop or speed servo loop according to a selection signal 111 from the CPU 101.

The operation for the position control of the sub-scanning unit 29 is now described. The input data to the D/A converter 104 is an 8-bit data. The D/A converter 104 outputs 0[V] when the input data is '80' H (Hexadecimal). An interruption pulses generating circuit 112 generates periodic interruption pulses 134 sent to the CPU 101. In response to each pulse of the interruption pulses 134, the CPU 101 calculates a position reference and a difference between the position reference and the current position data of the sub-scanning unit 29, and outputs the difference data to the D/A converter 104 to make it output a voltage equivalent to the difference data. The lead/lag filter 105 makes phase compensation to the output voltage from the D/A converter 104 to stabilize the position servo loop. The amplifier 106 amplifies the output of the lead/lag filter 105 to determine a feedback gain of the position servo loop. The low-pass filter 107 removes harmonic noise components contained in the output of the amplifier 106. The selectors 108 select an output signal 137 from the low-pass filter 107 according to the position-control/speed-control selection signal 111 outputted from the CPU unit 101, and outputs the signal 137 as a motor torque instruction 37 to the motor driver 25. Thus, the sub-scanning unit 29 is controlled so that its position is always held equal to the reference position calculated by the CPU 101.

The speed control of the sub-scanning unit 29 will now be described. The CPU 101 outputs to the D/A converter 104 a data equivalent to a difference between the current speed of the sub-scanning unit 29 and a calculated speed reference which is calculated during every interruption of the interruption pulses 134. The current speed of the sub-scanning unit 29 is determined by measuring the distance in which the sub-scanning unit has moved in a specific time. The amplifier 109 amplifies the output voltage from the D/A converter 104 to determine a feedback gain of the speed servo loop. The low-pass filter 110 is a noise filter. During the speed control, the position-control/speed-control selection signal 111 is controlled so that the selector 108 selects an output signal 138 from the low-pass filter 110 and delivers it as the motor torque instruction 37.

Figure 5:
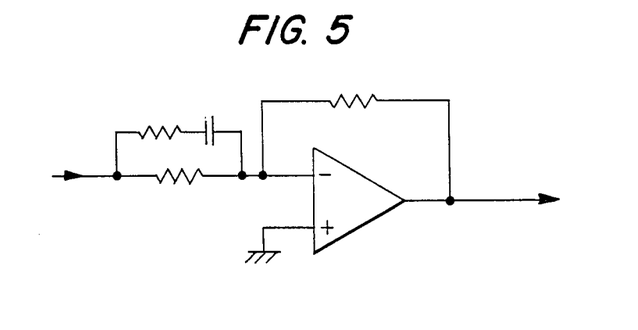
FIG. 5 is a circuit diagram showing an example of the lead/lag filter in FIG. 4 block diagram.
Figure 6:
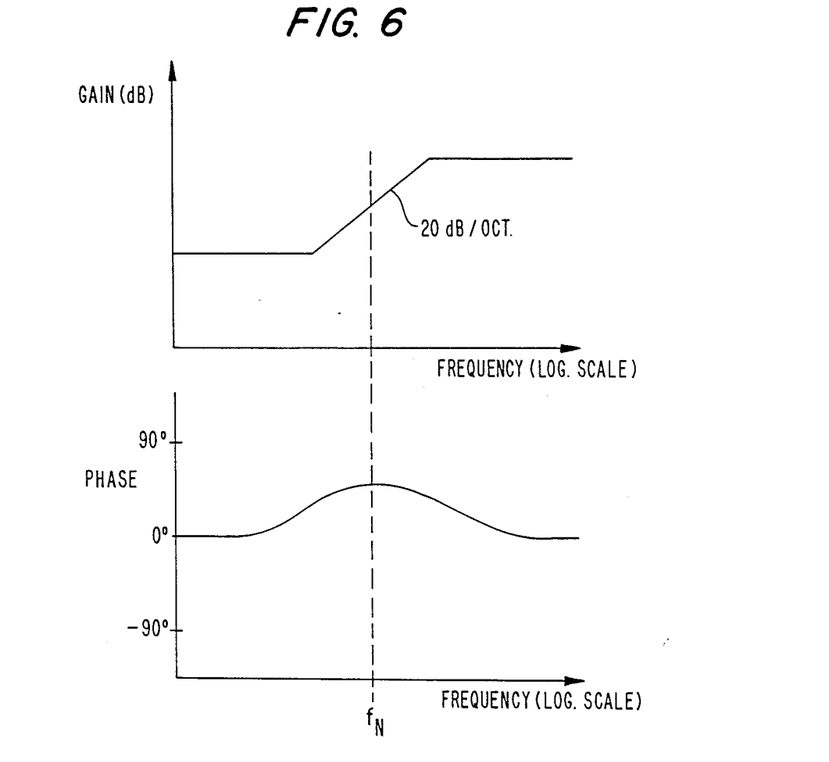
FIG. 6 is a frequency characteristic diagram of the filter shown in FIG. 5.

FIG. 5 is an examplary circuit diagram of the lead/-lag filter 105 using an operational amplifier. FIG. 6 is a Bode chart of the lead/lag filter of FIG. 5. It makes phase compensation of the position servo loop by leading the phase at a frequency $f_N$.

Figure 7:
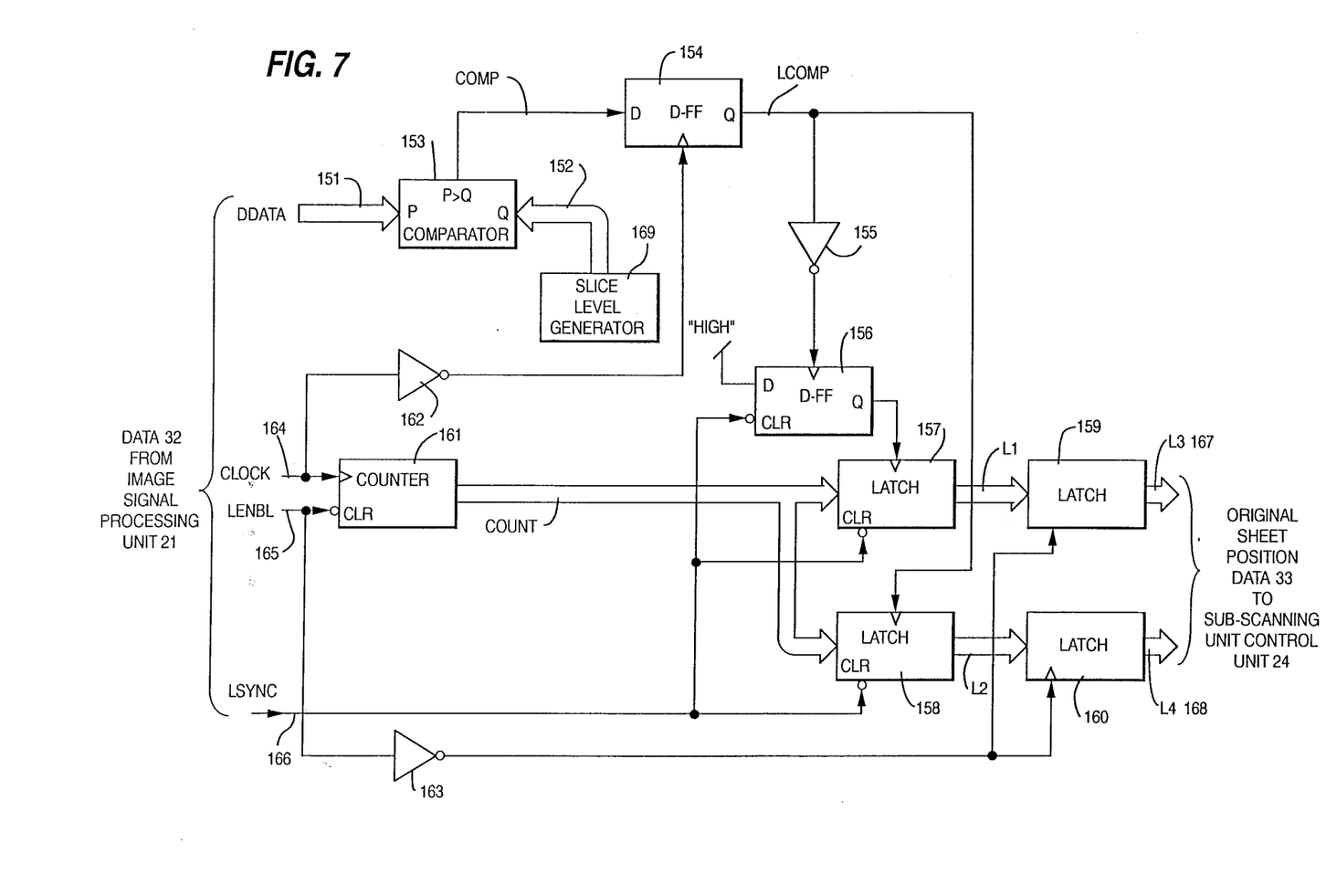
FIG. 7 is an internal block diagram of the original sheet position detecting circuit in FIG. 2 block diagram.
Figure 8:
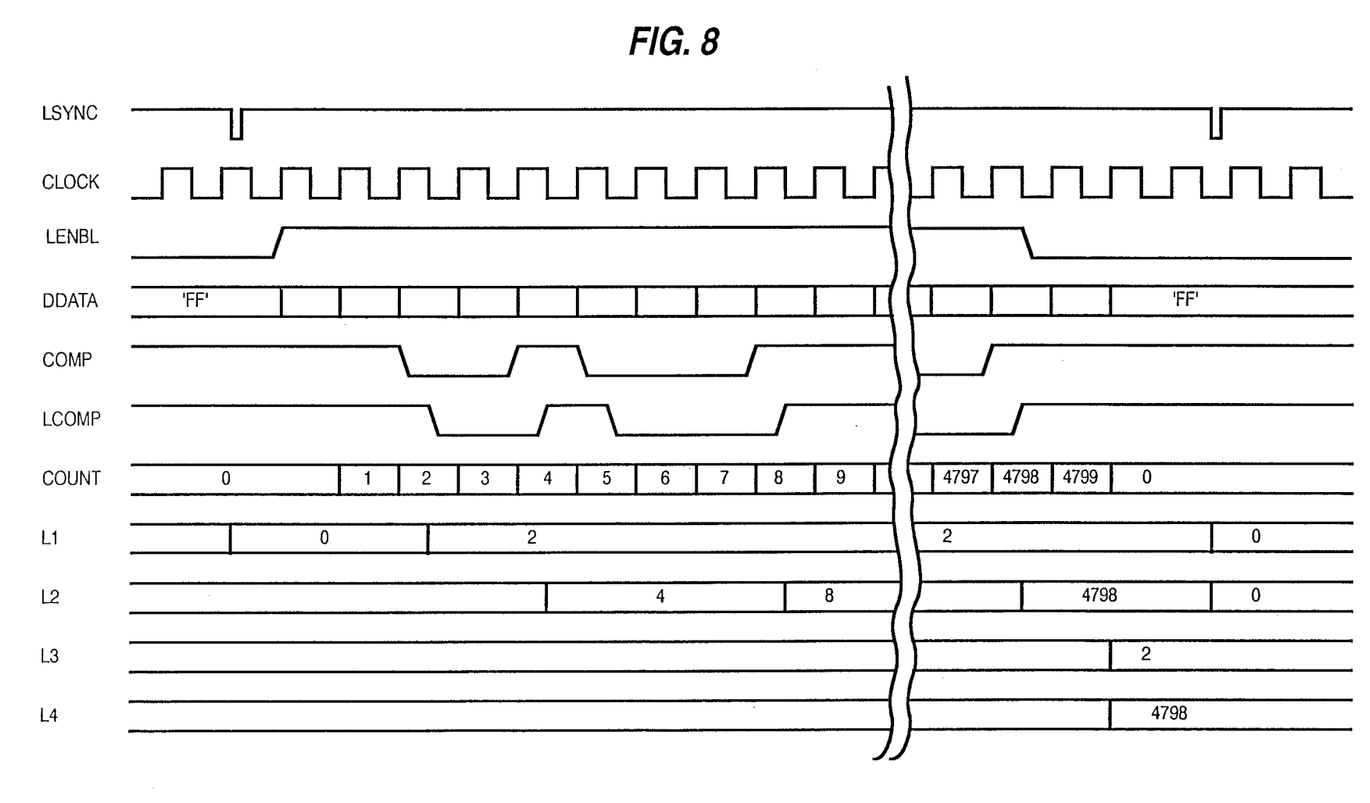
FIG. 8 is an operation timing chart of the circuit in FIG. 7.

The original sheet position detecting circuit 22 is now described with reference to FIGS. 7 and 8. FIG. 7 is a block diagram of the original sheet position detecting circuit 22, and FIG. 8 is an operation timing chart of the original sheet position detecting circuit 22 of FIG. 7. When detecting the original sheet position, the color at the original sheet side of the original sheet cover 2 is made black. Both edges of the original sheet is detected by once prescanning the whole reading area. The operation of the original sheet position detecting circuit 22 is hereinafter described. A density data 151 contained in the data 32 from the image signal processing unit 21 is an 8-bit data, denoting black by 'FF'H and white by '00'H. The density data 151 is synchronized with a clock 164 contained in the data 32. A slice level production circuit 169 produces an 8-bit data 152 (hereinafter called "slice level data") corresponding to an intermediate density between the texture density of the original sheet and the original sheet side density of the original sheet cover 2. Alternatively, the slice level data 152 may be outputted from the CPU 101.

A comparator 153 outputs a comparison signal (COMP) by comparing the density data (DDATA) 151 with the slice level data 152. An inverter 162 inverts the clock 164. A D-flip-flop 154 latches COMP from the comparator 153 with the output signal of the inverter 162 to output a signal LCOMP. A line enable signal (LENBL) 165 contained in the data 32 indicates an effective range of one line of DDATA.

A counter 161, which is cleared by LENBL 165 and counts the clock 164, outputs a count data (COUNT) indicative of a position coordinate in the main-scanning direction of DDATA 151. A line synchronizing signal (LSYNC) 166 contained in the data 32 is the main-scanning trigger signal.

An inverter 155 inverts LCOMP from the D-flip-flop 154. The D-flip-flop 156, with its D input being kept at the "HIGH" level, uses the output of the inverter 155 as the clock input, and LSYNC 166 as the clear input. A latch 157, using the output of the D-flip-flop 156 as the latch clock, latches the output of the counter 161 to output a data $L_1$. A latch 158, using LCOMP from the D-flip-flop 154 as the latch clock, latches the output of the counter 161 to output a data $L_2$. An inverter 163 inverts LENBL 165. A latch 159, using the output of the inverter 163 as the latch clock input, latches the data $L_1$ from the latch 157 to output a data $L_3$ 167. A latch 160, using the output of the inverter 163 as the latch clock input, latches the data $L_2$ from the latch 158 to output a data $L_4$ 168. The output data 167 and 168 ($L_3$ and $L_4$) from the latches 159 and 160 are read as data 33 by the CPU 101 through the I/O port 103.

Here, the meaning of each signal in the original sheet position detecting circuit 22 in FIG. 7 is described with reference to FIG. 8. The density data DDATA 151 is synchronized with the clock 164. The line enable signal LENBL 165 is synchronized with the clock 164 and is an active-high signal showing the effective range of DDATA 151. When the LENBL 165 is inactive ("LOW" level), the value of DDATA 151 is 'FF'H. The signal LCOMP is a signal obtained by latching the output signal COMP of the comparator 153 with the inverted signal of the clock 164. The data $L_1$ is obtained by latching the count output (COUNT) of the counter 161 with a first rising edge of LCOMP after LENBL 165 has become active ("HIGH" level). The data $L_3$ 167 is obtained by latching $L_1$ with a falling edge of LENBL. The data $L_2$ is obtained by latching COUNT with a rising edge of LCOMP. A data $L_4$ 168 is obtained by latching the data $L_2$ with a falling edge of LENBL. When no original sheet is found after one main-scanning, directional scanning has been completed, and the data $L_2$ and $L_3$ are each '0'. When an original sheet is found, the coordinates of the edges in the main-scanning direction of the original sheet are obtained as the data $L_2$ and $L_4$.

The CPU 101 can know determine the coordinates of the original sheet edges by sequentially reading the data $L_2$ and $L_4$ and the current position data of the sub-scanning unit 29 during the pre-scanning. The warning display on the operation panel 3 when the original sheet is placed obliquely, and the removal of mal-detection of the coordinates in the main-scanning direction of the original sheet edges due to a stain on the original table 14 or on the original sheet 2, can be controlled in the program of the CPU 101.

Figure 9A:
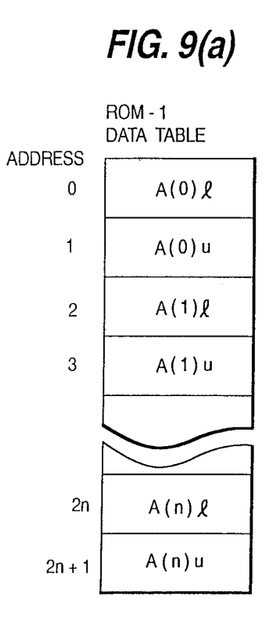
FIGS. 9(a), (b) and (c) are memory layout diagrams showing data tables of ROM-1, ROM-2 and ROM-3 in FIG. 2 block diagram, respectively.
Figure 9B:
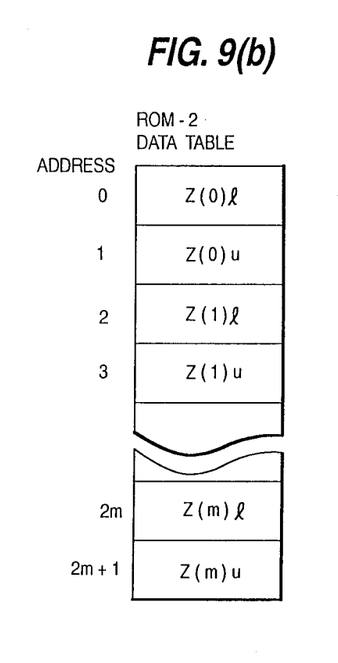
Figure 9C:
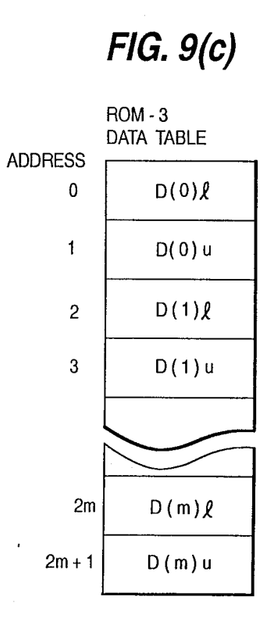

The contents of the data stored in ROM-1 118, ROM-2 119, and ROM-3 120 in FIG. 4 are now described by referring to FIG. 9.

Figure 11A:
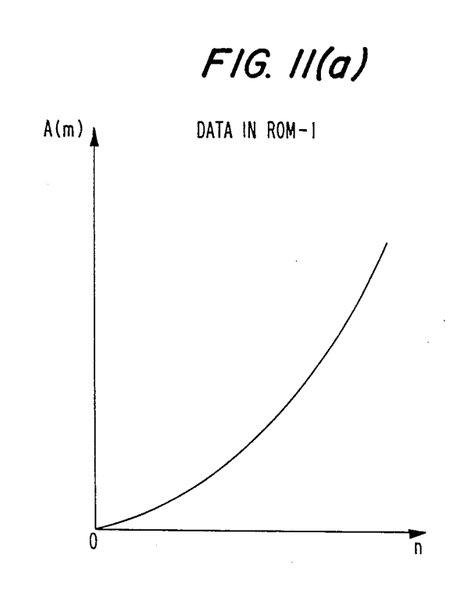
FIGS. 11(a) and 11(b) are graphs showing the data of ROM-1 and ROM-5 data tables, respectively.

ROM-1 118 stores a data table containing the acceleration position profile data of the sub-scanning unit 29. Assume that the moving distance of the sub-scanning unit 29 corresponding to one bit of the up/down counter 117 is P. Assuming the interruption frequency of the interruption pulses 134 to the CPU 101 to be f[Hz], an nth acceleration position profile data A(n) is determined by:

$$A(n) = INT(\frac{1}{2} \cdot a \cdot 1/f \cdot n \cdot 1/P)$$

where INT( ) denotes an integerizing function and a is an acceleration. FIG. 9(a) shows the data arrangement of the ROM-1 data table. In FIG. 9(a), A(n)l is a lower byte and A(n)u is an upper byte of A(n). FIG. 11(a) shows the value change of the data in the ROM-1 data table.

ROM-2 119 stores the addresses of ROM-1 in each of which is stored a position data corresponding to a position at which an acceleration operation is to be completed. When performing enlargement or reduction copying in the sub-scanning direction, assuming the speed of the sub-scanning unit 29 to be Vs, and the process speed of the printer unit 23 to be Vp, the zooming ratio m [%] is expressed as:

$$m = Vp/Vs \times 100 \ [\%]$$

The sub-scanning unit 29 is accelerated to reach the speed of Vs=(Vp/m)×100 based on the acceleration position profile data of ROM-1, and then changed to a state under a fixed-speed position profile control. The ROM-1 118 addresses stored in ROM-2 showing the ends of the acceleration position profile control are determined according to the zooming ratio in the sub-scanning direction. Data Z(m) in the data table in ROM-2 can be expressed by:

$$Z(m) = INT(2 \cdot Vp/am \cdot 100)$$

Assuming the zooming ratio actually used to be in the range of 50-400%, then Z(m) {50≦m≦400} are the effective data. FIG. 9(b) shows the arrangement of data in the data table in the ROM-2. Z(m)l is a lower byte and Z(m)u is an upper byte of Z(m).

The ROM-3 120 stores, as a data table, the approach distance in which the sub-scanning unit 29 attains a specified speed by acceleration from a stop position. As described above, since the sub-scanning speed of the sub-scanning unit 29 varies depending upon the zooming ratio in the sub-scanning direction, the acceleration distance of the sub-scanning unit 29 changes depending upon the magnification ratio in the sub-scanning direction. The approach distance is the sum of the acceleration distance accelerated using the acceleration position profile data and the stabilizing distance from the end of acceleration to the stabilizing in the specified speed. The approach distance table data D(m) is determined by:

$$D(m) = A(\frac{1}{2}Z(m)) + m \cdot b$$

where m·b is the stabilizing distance, and b is a constant. FIG. 9(c) shows the arrangement of the data table in ROM-3. D(m)l is a lower byte and D(m)u is an upper byte of D(m).

Figure 12A:
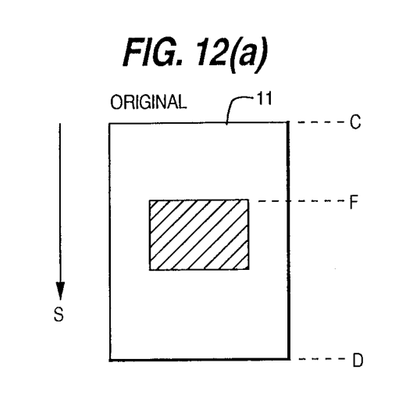
FIG. 12 is a view showing a positional relationship between an original sheet and a copied image to illustrate the transfer copying.
Figure 12B:
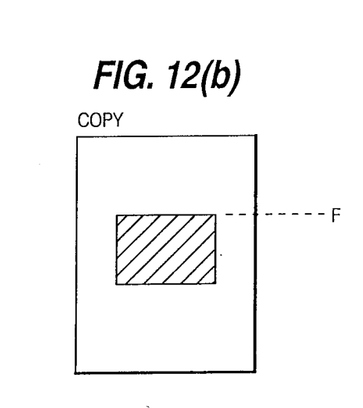

Before describing the content of data table in ROM-4 121, the method of transfer copying in the sub-scanning direction is described. First, the operation sequence of the sub-scanning unit 29 when an original sheet 11 shown in FIG. 12(a) is copied in the same position on a printing sheet as shown in FIG. 2(b) is described with reference to FIGS. 13 and 14. Arrow S in FIG. 12 shows the sub-scanning direction. FIG. 13 shows a positional relation between the sub-scanning unit 29 and the original sheet 11. Point A is the home position where the sub-scanning unit 29 stops when the copier is not operating. An approach start point B of the sub-scanning unit 29 is located in a position shifted toward A from an original sheet reading start point C by an approach distance $x_1$. Point D is an original sheet reading end point.

Figure 14:
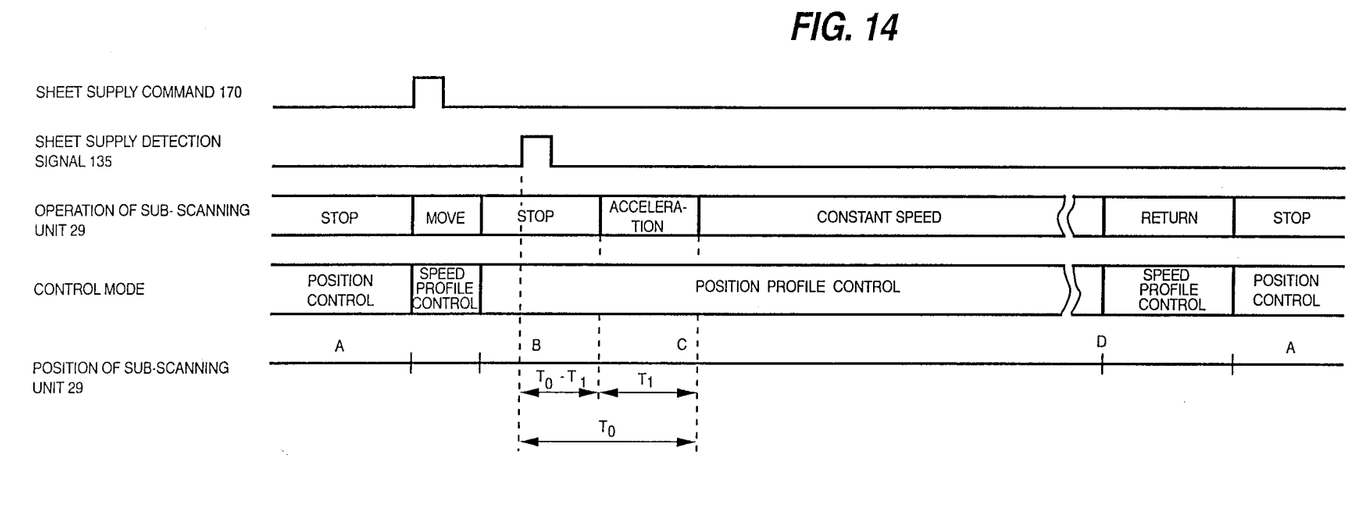
FIGS. 14, 15, and 16 are diagrams showing the operation sequences of the sub-scanning unit.

FIG. 14 is an operation sequence diagram when the originals are copied without being transferred. Before the copying operation is started, the sub-scanning unit 29 remains still in the home position A. When a copying operation is started, the CPU 101 outputs a sheet supply command 170 (FIGS. 2 and 4) to the printer unit 23. On the other hand, the sub-scanning unit 29, after reading the white level reference data for shading correction at point A, moves to point B under the speed profile control before the sheet supply sensor 53 (FIG. 3) detects a printing sheet. At a time $T_0$ seconds after the sheet supply sensor 53 detects the printing sheet, the sub-scanning unit 29 must reach point C and being outputting the image signal to the printing unit 23. Assuming the time required for acceleration of the sub-scanning unit 29 to be $T_1$, the sub-scanning unit 29 stays at point B for $T_0-T_1$ seconds before starting acceleration according to the position profile control. The sub-scanning unit 29 scans the original sheet 11 under the position profile control from point C to point D, and upon reaching to point D, returns to point A under the speed profile control.

Figure 12C:
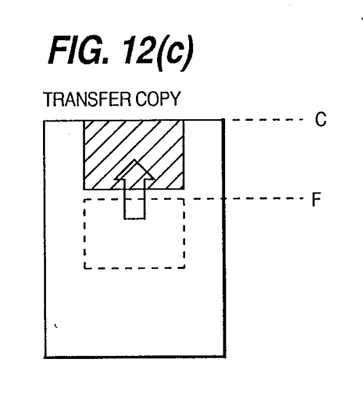
Figure 13:
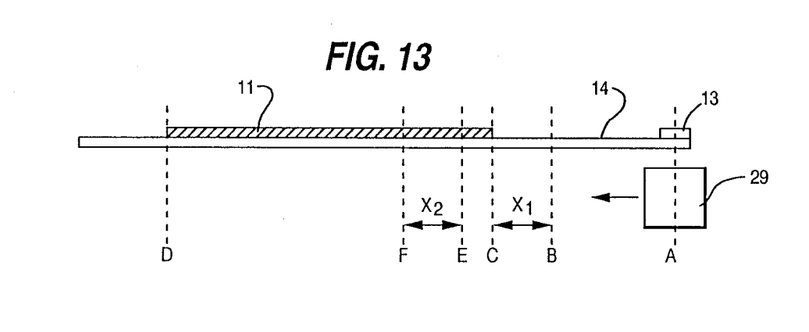
FIG. 13 is a side view showing a positional relationship between an original sheet and the sub-scanning unit.
Figure 15:
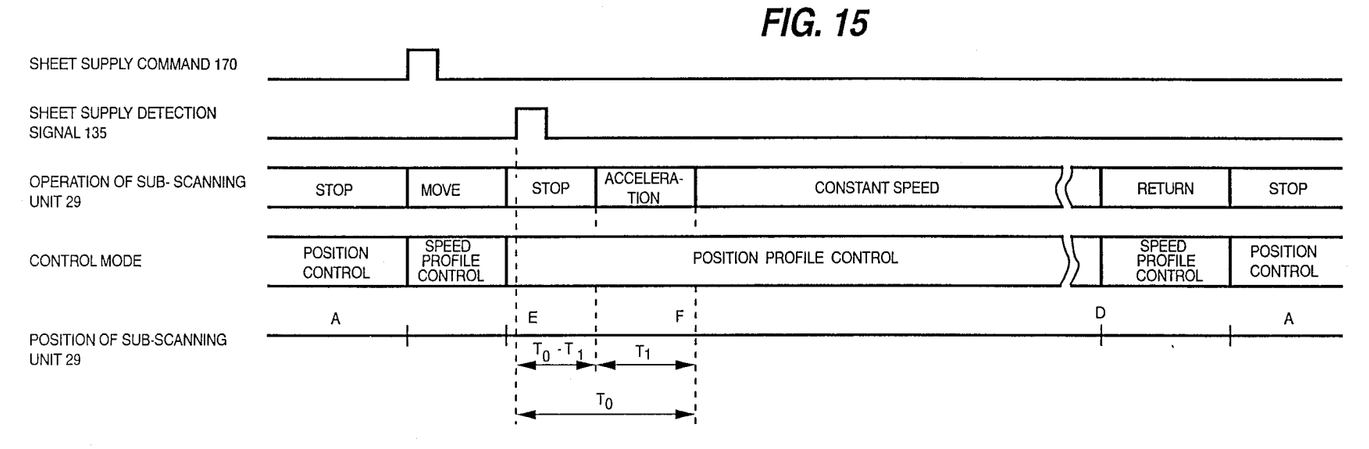

The operation sequence of the sub-scanning unit 29 when the original is transfer-copied as from FIG. 12(a) to FIG. 12(c) is described with reference to FIG. 15. In this case, the waiting position or acceleration start position of the sub-scanning unit 29 is point E. Point E is displaced from point F toward point A by an approach distance $X_2$. By shifting the original reading start position from point C to point F, transfer copying in the reverse direction to the sub-scanning direction is effected.

Figure 12D:
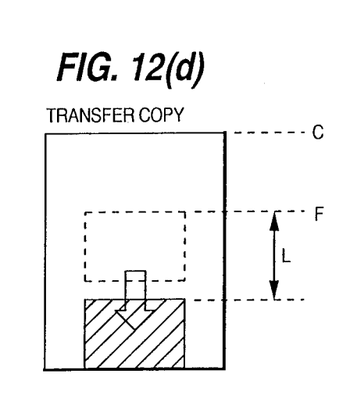
Figure 16:
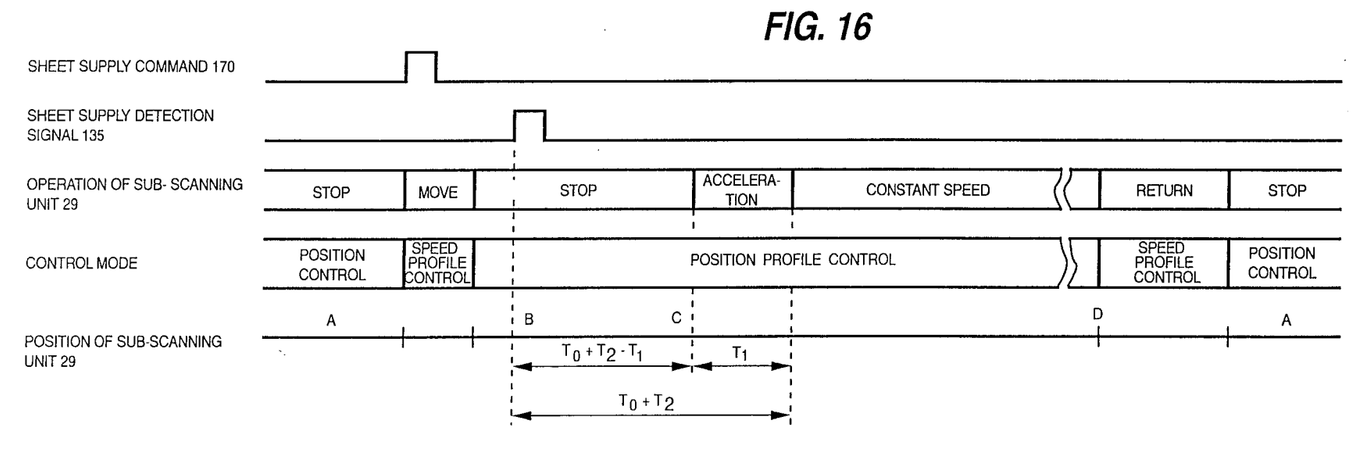

Next, the operation sequence of the sub-scanning unit 29 when the original is transfer-copied as from FIG. 12(a) to FIG. 12(d) is described with reference to FIG. 16. A time $T_0+T_2$ elapses from the time the sheet supply sensor 53 detects the printing sheet to the time the sub-scanning unit 29 reaches point C. When the copying of the original is performed by being transferred in the sub-scanning direction by a transfer distance L as shown in FIG. 12(d) a distance L, $T_2$ is determined by L/Vp.

Figure 10A:
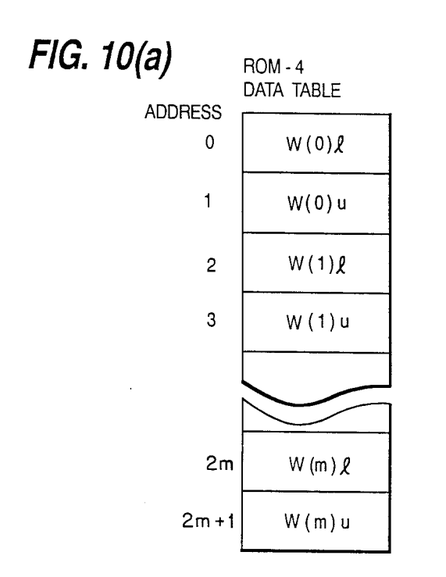
FIGS. 10(a) and (b) are memory layout diagrams showing data tables of ROM-4 and ROM-5 in FIG. 2 block diagram, respectively.

The content of data in ROM-4 121 is described here. Since the approach time $T_1$ depends upon the zooming ratio in the sub-scanning direction, data representing $T_0-T_1$ for respective zooming ratios are previously stored as data table in ROM-4. Each data is made in the form of $(T_0-T_1) \cdot f_c'$ and the number of interruptions of interruption pulses 139 of frequency $f_c$ generated by a time-counting interruption pulse generating circuit 113 (FIG. 4) is counted. Assuming the zooming ratio in the sub-scanning direction to be m%, the data table W(m) of ROM-4 121 is given by:

$$W(m) = \text{INT}(\{\tfrac{1}{2}Z(m)\cdot 1/f + m\cdot b/Vs\}f c)$$

where $Vs = Vp/m \times 100$. Since the interruption count of the frequency fc corresponding to $T_2$ is obtained by $T_2 fc$, the CPU 101 can calculate the interruption count for determining the waiting time at point B according to the transfer distance of the transfer copying. FIG. 10(a) shows the data table arrangement in ROM-4. W(m)l is a lower byte and W(m)u is an upper byte of W(m).

Figure 10B:
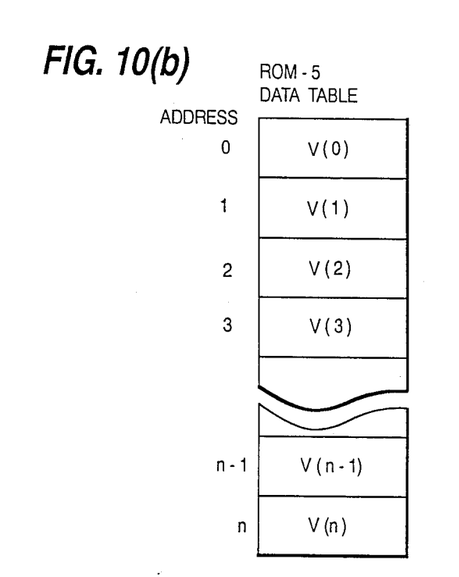
Figure 11B:
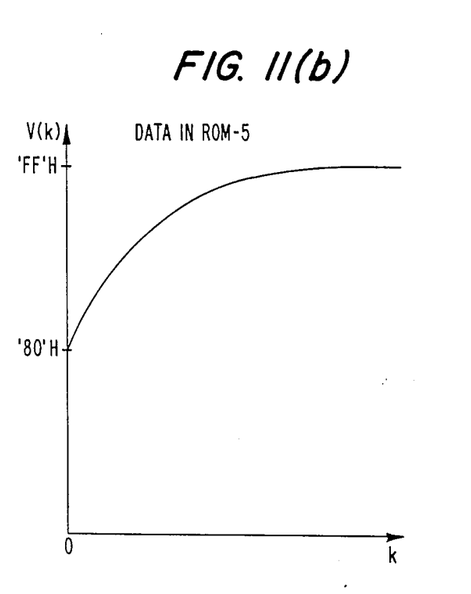

The content of data in ROM-5 122 is now described. The ROM-5 122 stores speed profile data used when the sub-scanning unit 29 is moved to a target position some extent remote from a certain position at high speed. The data table contains speed reference data corresponding to a distance between a current position of the sub-scanning unit 29 and a target position. Here, the control of the sub-scanning unit 29 is switched to the speed control. The speed V of the sub-scanning unit 29 is determined from a distance $D = j\cdot P$ (j is an integer) the sub-scanning unit 29 has moved in a time $i\cdot 1/f$ (i is an integerinteger constant). That is, $V = (j\cdot P)/(i\cdot 1/f)$. The speed reference table data V(n) is determined by:

$$V(n) = \text{INT}\left(\frac{i\sqrt{2a'nP}}{Pf} + \text{'80'}H\right)$$

where the value '80'H is an offset data 0[V] of the D/A converter 104 (FIG. 4). FIG. 10(b) shows the arrangement of the data table in ROM-5. FIG. 11(b) shows the graph of the data table in ROM-5.

The drive sequence of the sub-scanning unit 29 in copying is described from the aspect of the program flow of the CPU 101. When the power supply of the copier is turned on, the CPU 101 outputs '70'H to the D/A converter 104. Since the D/A converter 104 outputs a negative voltage, the torque command of the motor driver 25 becomes negative, so that the sub-scanning unit 29 moves in the direction toward the home position sensor 18. When the home position sensor 18 detects the sub-scanning unit 29, the counter 117 which counts the position of the sub-scanning unit 29 is cleared. After the counter 117 has been cleared, the speed control loop is selected by the selector 108. Assuming the difference in position between the home position and the position of sub-scanning unit 29 to be dl, the data V(dl) in ROM-5 is read as the speed reference. Unit the sub-scanning unit 29 nears the home position, the CPU 101 outputs the difference between the speed reference and the sub-scanning unit speed to the D/A converter 104. In such speed profile control, when the distance between the sub-scanning unit and the target position is large, the sub-scanning unit moves at a high speed and slows down as it approaches the target position. When the sub-scanning unit 29 comes sufficiently close to the home position, the selector 108 is switched to select the position control loop. Until a copy command is received from the operation panel, the CPU 101 outputs a position difference of the sub-scanning unit position from the position reference corresponding to the home position to the D/A converter 104. That is, in the position control, the sub-scanning unit 29 is controlled so as to stay in the position of the position reference.

When a copying command is received, the CPU 101 outputs a sheet supply command 170 to the printer unit 23, and selects the speed control to control the sub-scanning unit 29 under the speed profile control. The target position at this time is a position determined by subtracting an approach distance obtained from the ROM-3 data table from the front edge position of the original sheet or an original read start position specified by the coordinate input tablet 5a. This is the waiting position. The sub-scanning unit 29 stays in the waiting position under the position control. $T_0 - T_1$ seconds after the sheet supply sensor 53 detected the printing sheet ($T_0 - T_1$ is obtained using the table data in ROM-4), the sub-scanning unit 29 starts acceleration from the waiting position. Here, the position reference is obtained by adding A(n) to the waiting position using the table data in ROM-1. The numeral n makes an increment every time an interruption of frequency f occurs. The position control is performed so that the position of the sub-scanning unit 29 is kept equal to the position reference. The acceleration is completed by use of the table data in ROM-2, and the control mode is changed to the constant speed position profile control. Here, the position reference makes increments every time the interruption occurs. By changing the interruption frequency f, the constant speed can be changed according to the zooming ratio. When the sub-scanning unit 29 reaches the original reading end position, the CPU 101 sets the home position as the target position and returns the sub-scanning unit 29 to the home position by the speed profile control. Near the home position, the sub-scanning unit 29 is controlled by the position control.

In the case of the continuous repetitive copying onto a plurality of printing sheets, the waiting position is set as the target position. The sub-scanning unit 29 is returned to the waiting position by the speed profile control after each sub-scanning, and subjected to the position control at the waiting position to be ready for the next sub-scanning. Since the sub-scanning unit does not return to the home position during the continuous repetitive copying, the sequence operation time of the sub-scanning unit required for each sub-scanning is shortened. Thus, the copying speed is increased.

Since accurate approach time and accurate approach distance of the sub-scannning unit can be obtained because of the position profile control of the sub-scanning unit, high position accuracy of copied image can be obtained even in enlargement, reduction, and transfer copying modes. Since the speed profile control is effected when moving the sub-scanning unit to a target position from a certain position, the sub-scanning unit can be moved at a high speed, thereby maximizing utilization of motor torque.

The above description was made on an embodiment of the digital copier using an image sensor, but similar effects can be obtained also with an analogue copier.

What is claimed is:

1. A copier comprising:
   an original table for placing thereon an original sheet;
   a sub-scanning unit including an image reading means for reading an image on said original sheet on said original table and for scanning said original sheet on said original table;
   a printing means for printing said image read by said image reading means on a printing sheet; and a control means for controlling operation of said sub-scanning unit by selectively using a position profile control and a speed profile control.

2. A copier as claimed in claim 1, wherein said control means controls an operation start position of said sub-scanning unit according to an image reading start position.

3. A copier as claimed in claim 1, further comprising a copy mode selection means for selecting a copy mode including at least one of enlargement, reduction and transfer,
wherein said control means controls an operation start position an an operation start timing of said sub-scanning unit according to an original sheet reading start position and a copy mode selected by the copy mode selection means.

4. A copier as claimed in claim 1, wherein said control means is provided with a storage means for storing data for determining an operation start position and an operation start timing of said sub-scanning unit, and wherein said control means controls an operation start position and an operation start timing of said sub-scanning unit by reading said stored data according to an image reading start position.

5. A copier as claimed in claim 1, further comprising a copy mode selection means for selecting a copy mode including at least one of enlargement, reduction, and transfer of copying image, wherein said control means is provided with a storage means for storing data for determining an operation start position and an operation start timing of said sub-scanning unit, and wherein said control means controls said operation start position and said operation start timing of said sub-scanning unit by reading said stored data according to an image reading start position and according to a copy mode selected by the copy mode selection means.

6. A copier as claimed in claim 1, wherein said control means comprises:
a drive means for driving said sub-scanning unit;
a status detecting means for detecting position and speed of said sub-scanning unit;
a storage means for storing position reference data and speed reference data;
a position control means constituting a position servo loop together with said drive means and said status detecting means;
a speed control means constituting a speed servo loop together with said drive means and said status detecting means;
a servo loop selecting means for selecting one of said position servo loop and said speed servo loop; and
a central porcessing unit selectively controlling said position control means and said speed control means by using said position reference data and said speed reference data stored in said storage means.

7. A copier as claimed in claim 1, wherein said control means comprises:
a position control means for controlling said sub-scanning unit by said position profile control;
a speed control means for controlling said sub-scanning unit by said speed profile control; and
a control selection means for selectively changing over said position control means and said speed control means according to said operation of said sub-scanning unit.

* * * * *